(12) United States Patent
Rubin

(10) Patent No.: US 8,595,603 B2
(45) Date of Patent: Nov. 26, 2013

(54) APPARATUS AND METHODS FOR SELECTIVE BLOCK DECODING

(75) Inventor: Amir Rubin, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 13/075,078

(22) Filed: Mar. 29, 2011

(65) Prior Publication Data

US 2012/0254703 A1 Oct. 4, 2012

(51) Int. Cl.
*H03M 13/00* (2006.01)

(52) U.S. Cl.
USPC .......................... 714/784; 714/752; 714/758

(58) Field of Classification Search
USPC .......................... 714/752, 758, 784
See application file for complete search history.

(56) References Cited

U.S. PATENT DOCUMENTS

| | | | |
|---|---|---|---|
| 5,926,489 A | 7/1999 | Luthi et al. | |
| 5,936,972 A * | 8/1999 | Meidan et al. | 714/712 |
| 6,526,531 B1 | 2/2003 | Wang | |
| 2003/0103585 A1* | 6/2003 | Kim et al. | 375/340 |
| 2005/0053040 A1* | 3/2005 | Choi et al. | 370/335 |
| 2006/0013181 A1* | 1/2006 | Stolpman et al. | 370/342 |
| 2009/0049358 A1* | 2/2009 | Jalloul et al. | 714/752 |
| 2009/0086855 A1* | 4/2009 | Jin et al. | 375/341 |
| 2011/0058484 A1* | 3/2011 | Kim et al. | 370/242 |
| 2012/0119928 A1* | 5/2012 | Yang | 341/94 |

FOREIGN PATENT DOCUMENTS

WO 2007/087511 A2 8/2007

OTHER PUBLICATIONS

International Search Report and Written Opinion mailed Sep. 26, 2012 from International Application No. PCT/US2012/026376.

* cited by examiner

*Primary Examiner* — Sam Rizk
(74) *Attorney, Agent, or Firm* — Schwabe, Williamson & Wyatt, P.C.

(57) ABSTRACT

Apparatus and methods for selective decoding of received code blocks are disclosed. An example method includes receiving a code block, determining a code block quality indicator for the received code block, and attempting to decode the received code block if the code block quality indicator is greater than or equal to a threshold. If the code block quality indicator is less than the threshold, the received code block is discarded without decoding attempts. The threshold may be a static or dynamic threshold.

16 Claims, 5 Drawing Sheets

APPARATUS AND METHODS FOR SELECTIVE BLOCK DECODING

TECHNICAL FIELD

The present disclosure generally relates to digital communications. More specifically, the technology of the present disclosure is applicable to the decoding of code blocks by a digital receiver.

BACKGROUND

Digital communication technologies have become an integral part of every-day modern life. For example, digital communication technologies enable wired and/or wireless data reception and/or transmission to and/or from a wide range of computing and other devices such as mobile telephones, other mobile devices, televisions, computer systems, telemetry systems, and/or the like. Likewise, digital communications technologies are employed to provide voice and/or data communications for a wide range of business and consumer applications. For many of these and other digital communication devices and applications, engineers often strive to design systems of relatively low complexity and that consume relatively little power.

Signals within and/or between digital communication devices are often encoded for transmission, for example, with forward error correction coding (e.g., block coding, Hamming coding, Golay coding, etc.). Decoders are often included in digital communication devices to decode signals after reception. While use of coding typically improves the ability of receiving devices to re-create a transmitted signal in spite of channel non-idealities (e.g., signal degradations due to environmental loss, noise, interference, etc.), many encoding/decoding processes are mathematically/processor intensive. Accordingly, inclusion of a decoder in a device increases the complexity of the device—especially if the decoder is a high-performance decoder.

Moreover, typically known decoders offer only finite error correcting capabilities. In other words, these decoders may only be able to decode signals that are degraded by less than a correctable amount of degradation. For example, if a signal has been degraded by more than the correctable amount of degradation, the decoder may be unable to decode the signal. As examples, bit error rate (BER) and code strength are metrics that can be used to characterize the decodablilty of a received signal.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION

Figure 1:
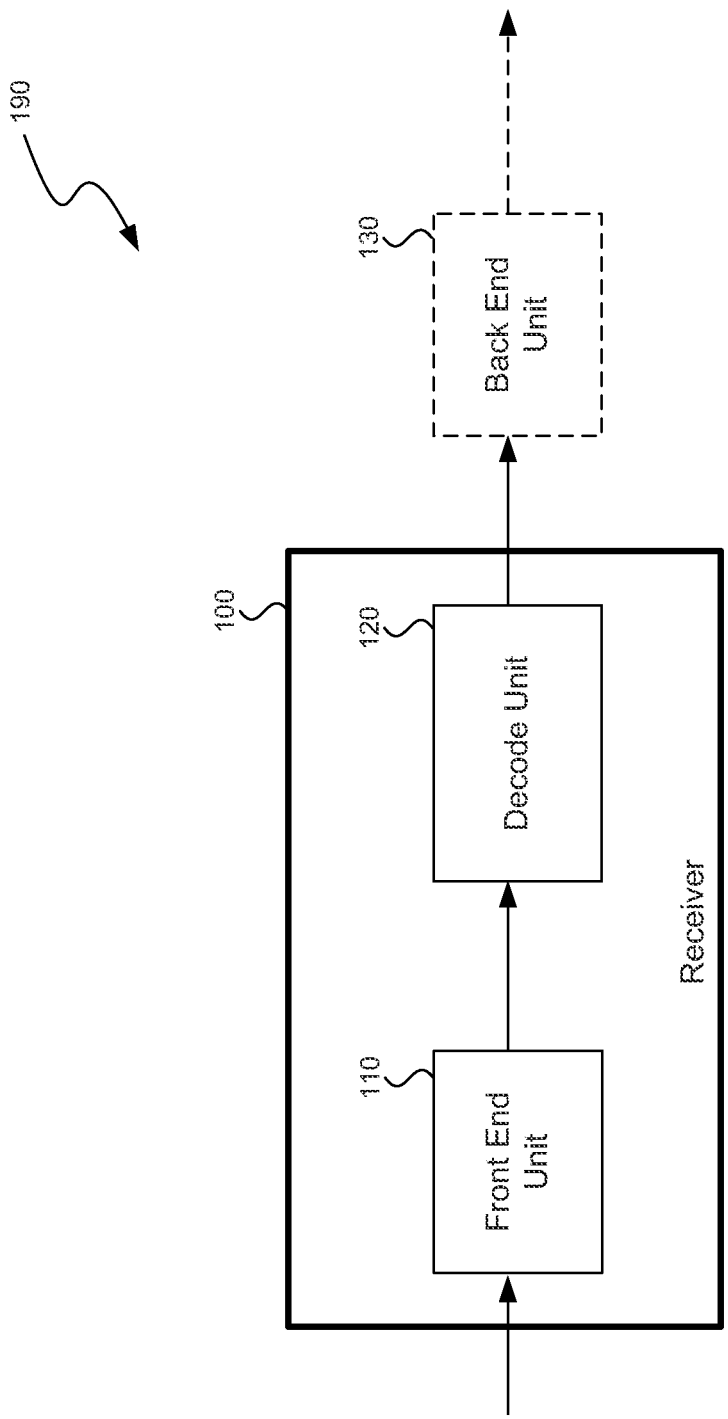
FIG. 1 is a block diagram of a computing device in accordance with an embodiment of the present disclosure.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology.

Although certain terms may be emphasized below, any terminology intended to be interpreted in any restricted manner will be overtly and specifically defined as such in this Detailed Description section. The terms "based on," "based upon," "according to," and/or the like are not exclusive and are equivalent to the term "based, at least in part, on" or similar and include being based on/according to additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, complementary, single-ended, or any other digital or analog signaling or modulation technique. For clarity of illustration, various signals may be illustrated in the figures using a single line. However, any such illustration should not be construed as limiting such a signal to being a single-bit signal. Rather, such signals may be multi-bit signals, unless specifically described in this Detailed Description as being only a single-bit signal. Likewise, interconnecting lines as shown in the figures are merely provided to illustrate one or many possible data flow arrangements between interconnected elements. Other data flow arrangements are possible. In the description that follows, the scope of the term "some embodiments" is not to be so limited as to mean more than one embodiment, but rather, the scope may include one embodiment, more than one embodiment, or perhaps all embodiments. Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Apparatus and methods for selective decoding of received code blocks are disclosed. An example method includes receiving a code block, determining information relevant to decoding received code blocks (e.g., a code block quality indicator for a received code block), and selectively attempting to decode the received code block if the relevant information is greater than or equal to a threshold. If the relevant information is less than the threshold, the received code block is discarded without decoding attempts.

The technology of the present disclosure may be employed to simplify the design of data receivers, for example, by enabling the use of less complex, lower speed, and/or less sophisticated decoders. In particular, disclosed embodiments attempt to decode code blocks which are expected to be decodable, but discard other code blocks without attempting to decode them if the code blocks are not expected to be decodable by the decoder. In this way, resources are not expended to perform potentially unjustified decoding attempts on code blocks that are unlikely to be successfully decoded. By preventing the potentially unjustified decoding attempts, less decoder bandwidth may be needed and thus a less complex, lower speed, and/or less sophisticated decoder may be employed.

In addition, a static or dynamic threshold may be employed to determine whether or not to attempt decoding of code blocks. As one example, a dynamic threshold that is based on an available decoding capacity of the decoder (e.g., a presently available decoder bandwidth) may be suitably employed. The available decoding capacity of the decoder may be determined based on real-time or near-real-time feedback. Further, use of such a dynamic threshold may enable decoding attempts on a greater percentage of code blocks if the decoder is operating at a relatively light load and more stringently reserve decoder bandwidth for likely decodable code blocks if the decoder is operating at a relatively high load.

The technology disclosed herein may be employed in computing and/or other devices having digital communications interfaces. For example, the disclosed technology may be employed in the receiver of a mobile device, in a wide or local area network interface of a computer system, in a television receiver system, in a global positioning system (GPS) receiver, and/or the like.

FIG. 1 is a block diagram of system 190. As illustrated, system 190 includes receiver 100 and optionally includes back end unit 130. As discussed above, system 190 may be employed with computing and/or other devices having digital communications interfaces. However, system 190 may be employed in other types of systems and/or devices.

As illustrated, receiver 100 includes front end unit 110 and decode unit 120. In addition, receiver 100 is configured to receive a code block, to demodulate the received code block, and to selectively attempt to decode the received code block based on a likelihood of successfully decoding the received code block, if attempted. In addition, receiver 100 may be further configured to pass decoded code blocks and/or the data contained therein to back end unit 130.

Receiver 100 may be virtually any type of digital receiver. For example, receiver 100 may be a wireless receiver (e.g., a receiver configured to receive and process wireless signals based on any one or more wireless protocols or standards such as Bluetooth, Long Term Evolution (LTE), Global System for Mobile Communications (GSM), code-division multiple access (CDMA), IEEE 802.11 (Wi-Fi), Advanced Television Systems Committee (ATSC), etc.). However, receiver 100 may also be a wired or optical receiver (e.g., a digital subscriber line (DSL) receiver, a Data Over Cable Service Interface Specification (DOCSIS) receiver, Fibre Channel (FC) receiver, Synchronous Optical Networking (SONET) receiver, an IEEE 802.3 receiver (Ethernet) receiver, etc.). In yet other embodiments, receiver 100 may be configured to receive signals from within a device, e.g., such as for use with error correcting code (ECC) memories.

As shown, front end unit 110 is configured to receive an input signal and to preprocess the input signal before providing an output to decode unit 120. In one embodiment, front end unit 110 is configured to receive a bit stream, to demodulate the received bit stream, and to generate the received code block from the demodulated bit stream. However, in another embodiment, front end unit 110 may be configured to simply receive code blocks from a digital communications interface.

Front end unit 110 may also include any suitable components or combinations thereof. For example, front end unit 110 may include a physical layer interface and/or a demodulator. In one embodiment, front end unit 110 includes a demodulator configured to determine a log-likelihood ratio (LLR) for each of bit of a received code block, or a subset of the bits, based on a soft-decision demodulation of the corresponding received bit.

In one embodiment, decode unit 120 is configured to selectively attempt to decode the received code block based on a likelihood of successfully decoding the received code block, if attempted. Further details regarding decode unit 120 are discussed below with reference to FIG. 2.

As shown in FIG. 1, system 190 also optionally includes back end unit 130. Back end unit 130 may include any component and/or combination of components configured to use or otherwise interact with decoded code blocks and/or the data contained therein. For example, back end unit 130 may include components typically associated with application layer, presentation layer, session layer, transport layer, network layer, or Internet layer functionality. As one specific example, back end unit 130 may be configured to enable user interaction with data from one or more decoded code blocks and may include, for example, a display, a user input device, and/or the like.

Elements of receiver 100 and/or back end unit 130 may be fabricated into or onto an integrated circuit, implemented in a field programmable gate array (FPGA), implemented in software (e.g., with a processor and a processor readable medium), implemented with discrete gates or components, and/or the like. In one embodiment, receiver 100 and back end unit 130 are fabricated into an integrated circuit.

Figure 2:
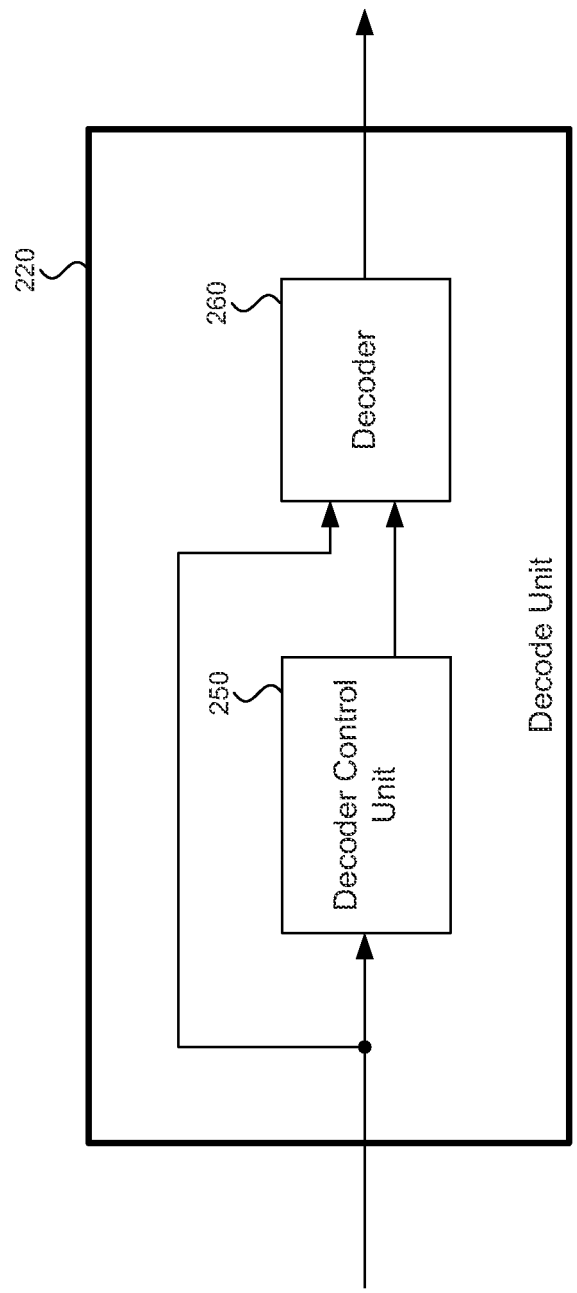
FIG. 2 is a block diagram of a decode unit in accordance with an embodiment of the present disclosure.

FIG. 2 is a block diagram of decode unit 220. Decode unit 220 may be employed as an embodiment of decode unit 120 of FIG. 1. As illustrated, decode unit 220 includes decoder control unit 250 and decoder 260.

In one embodiment, decoder control unit 250 is configured to selectively control decoder 260 by determining whether or not decoder 260 will attempt to decode a given code block. As one example, decoder control unit 250 is configured to determine a code block quality indicator for each code block and to compare the code block quality indicator to a threshold. Based on the outcome of the comparison, decoder control unit 250 may enable or disable decoder 260, selectively place the received code block into a queue for decoding by decoder 260, flag the received code block for decoding, flag the received code block to be discarded, and/or the like.

Further details regarding decoder control unit 250 are discussed below with reference to FIGS. 3 and 4.

In one embodiment, decoder 260 is configured to, based on an output of the comparison unit, selectively attempt to decode the received code block. For example, decoder 260 may be configured to receive an enable/disable signal from decoder control unit 250 and to attempt to decode a received code block if enabled but not to attempt to decode the received code block if disabled. In this example, received code blocks may be discarded without any attempt to decode the received code block if decoder 260 is disabled.

As one specific example, decoder control unit 250 and decoder 260 are configured to attempt to decode the received code block if the code block quality indicator is greater than or equal to the threshold and to discard the received code block without attempting to decode it if the code block quality indicator is less than the threshold.

Decoder 260 may include any decoder suitable for decoding the received code blocks. For example, decoder 260 may include a linear block decoder, a cyclic decoder, a Golay decoder, a Reed-Solomon decoder, and/or the like. However, other suitable decoders may be employed as decoder 260.

Figure 3:
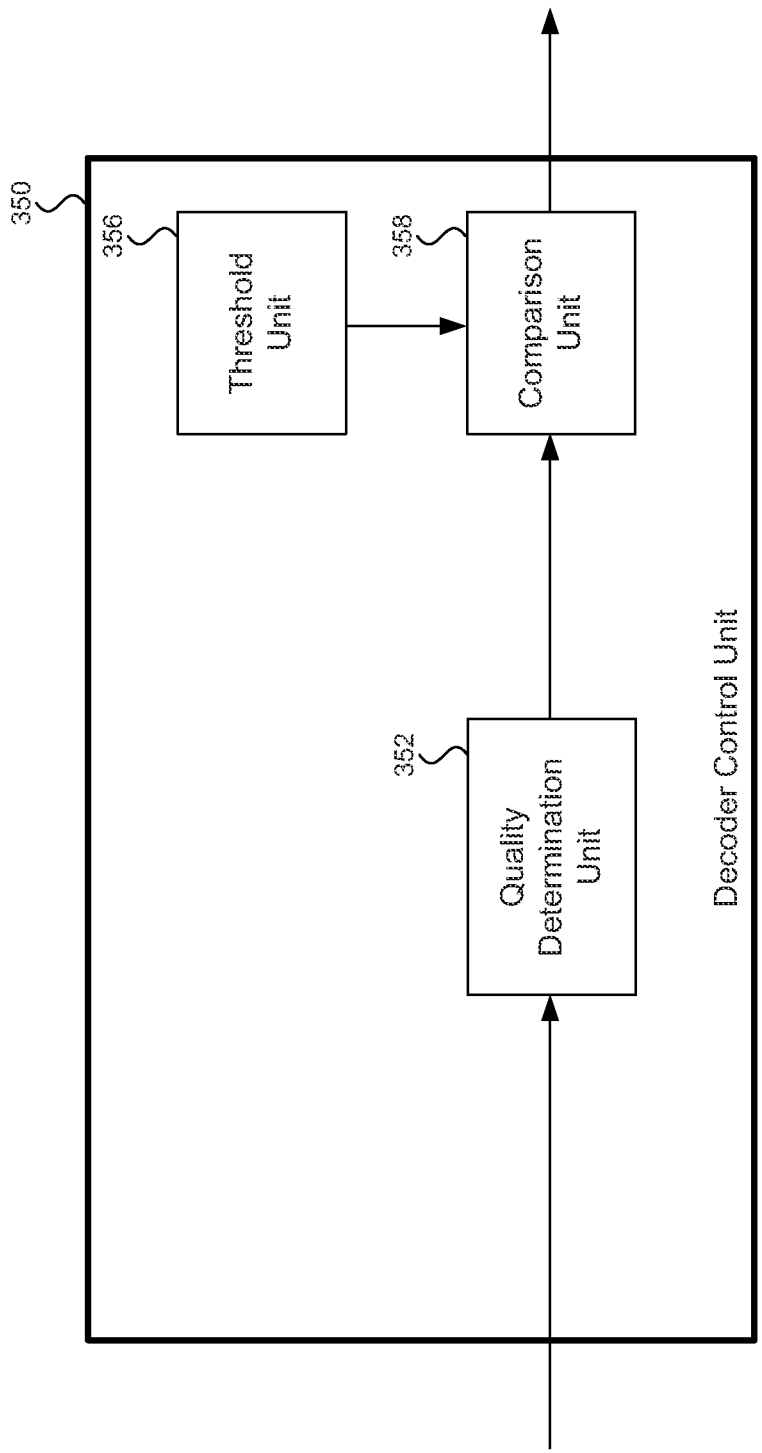
FIG. 3 is a block diagram of a decoder control unit in accordance with an embodiment of the present disclosure.

FIG. 3 is a block diagram of decoder control unit 350. Decoder control unit 350 may be employed as an embodiment of decoder control unit 250 of FIG. 2. As illustrated, decoder control unit 350 includes quality determination unit 352, threshold unit 356, and comparison unit 358. As discussed above, decoder control unit 350 may be configured to determine whether or not to attempt to decode a received and/or demodulated code block.

In one embodiment, quality determination unit 352 is configured to determine a code block quality indicator for a received code block based on a likelihood of successfully decoding the received code block, for example, if attempted by a given decoder (e.g., a decoder designed to be employed with quality determination unit 352).

Quality determination unit 352 may also be configured to determine the code block quality indicator by any suitable process, based on any suitable metric, or by any suitable combination of processes and/or metrics. As one example, quality determination unit 352 may be configured to determine a code block quality indicator based on an LLR calculated from the received code block and/or a portion thereof. In this example, the LLR may be a maximum or minimum LLR value from bits of the received code block, an average of LLRs from the bits of the received code block, an absolute value of an LLR/LLRs from one or more bits of the received code block, an absolute value of an average of LLRs from bits of the received code block, and/or the like.

In other examples, quality determination unit 352 may be configured to determine a code block quality indicator based on error vector magnitude (EVM) of the received code block, based on a Hamming distance between the received code block and a potential matching code block of a code book, or based on a distribution (e.g., an average or minimal Hamming distance between different code words) of Hamming distances between code blocks in an employed code book. In yet other examples, quality determination unit 352 may be configured to determine the code block quality indicator based on other metrics such as a received signal strength indication (RSSI), a signal-to-noise ratio (SNR), a received power spectral density (PSD), feedback regarding prior decode attempts, a characteristic (e.g., length, coding rate, or coding strength) of the received code block, and/or the like. Moreover, quality determination unit 352 may be configured to determine a code block quality indicator based on any combination of metrics and/or other factors, including those discussed above. As one particular example, quality determination unit 352 may be configured to determine a code block quality indicator based on a combination of (1) LLRs of a received code block, (2) an EVM of the received code block, and (3) soft-decision demodulation information from the received code block.

In one embodiment, threshold unit 356 is configured to provide a threshold to comparison unit 358 to enable comparison between a code block quality indicator for a received code block and the threshold. Threshold unit 356 may include any one or more of a variety of components for generating and/or storing the threshold. For example, threshold unit 356 may include volatile or non-volatile memory, a micro-processor interface, a micro-processor, a register, and/or the like.

In addition, the threshold may be either a static or a dynamic threshold. For example, threshold unit 356 may provide a dynamic threshold based on a real-time operational characteristic of the computing device which embodies receiver 100. An available decoding capacity of the decoder is one example of a real-time operational characteristic upon which the threshold may be based. In this example, the available decoding capacity may be determined based on real-time or near-real-time feedback. However, other embodiments may employ different and/or additional operational characteristics and/or variables to provide the threshold. For example, the dynamic threshold of yet another embodiment is based on a characteristic (e.g., length or coding strength) of the received code block and a real-time operational characteristic of the computing device embodying receiver 100.

In one embodiment, comparison unit 358 is configured to compare the code block quality indicator to a threshold and to selectively enable a decode attempt of the received code block (e.g., by decoder 260 of FIG. 2) based on an output of the comparison. In one possible embodiment, comparison unit 358 includes a digital comparator. However, any other suitable components or processes may be employed in comparison unit 358.

Figure 4:
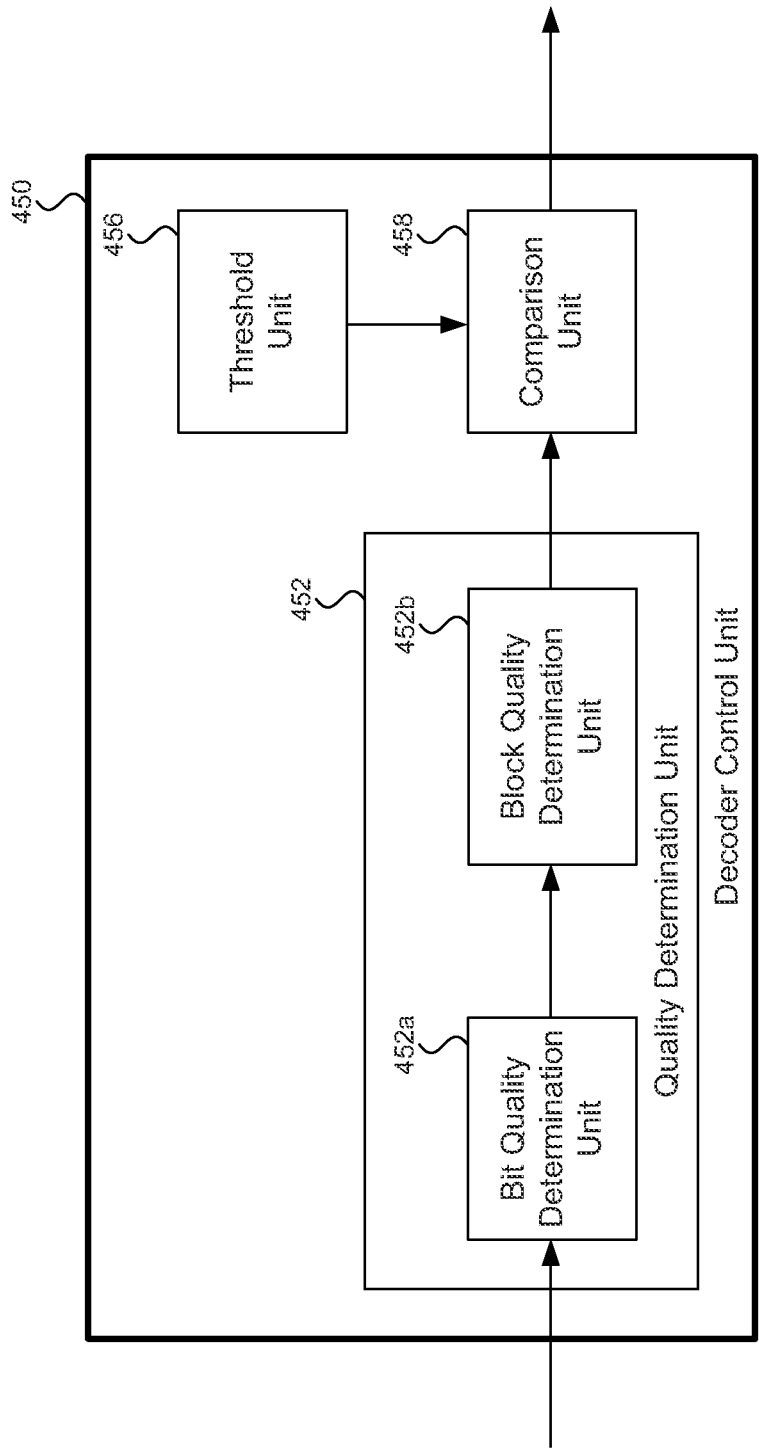
FIG. 4 is a block diagram of another decoder control unit in accordance with an embodiment of the present disclosure.

FIG. 4 is a block diagram of decoder control unit 450. Decoder control unit 450 may be employed as an embodiment of decoder control unit 250 of FIG. 2 or as an embodiment of decoder control unit 350 of FIG. 3. As illustrated, decoder control unit 450 includes quality determination unit 452, threshold unit 456, and comparison unit 458. As shown in FIG. 4, quality determination unit 452 includes bit quality determination unit 452*a* and block quality determination unit 452*b*. Quality determination unit 452 is also an example of quality determination unit 352 of FIG. 3, and can be employed as an embodiment thereof.

In quality determination unit 452, bit quality determination unit 452*a* is configured to determine bitwise quality information on the bits of a received code block (either all bits or a subset of the bits of the received code block) while block quality determination unit 452*b* is determined to determine a code block quality indicator for a received code block based on the bitwise quality information from bit quality determination unit 452*a*. As one specific example, bit quality determination unit 452*a* may be configured to determine bit quality indicators for each bit of the received code block based on the LLRs for each bit of the received code block and block quality determination unit 452*b* is configured to determine the code block quality indicator based on an average of the LLRs for each received bit of the received code block. In this example, the LLRs for the bits of the received code block are based on a soft-decision demodulation of the corresponding received bits.

Threshold unit 456 and comparison unit 458 may be employed as respective embodiments of threshold unit 356 and comparison unit 358 of FIG. 3.

Figure 5:
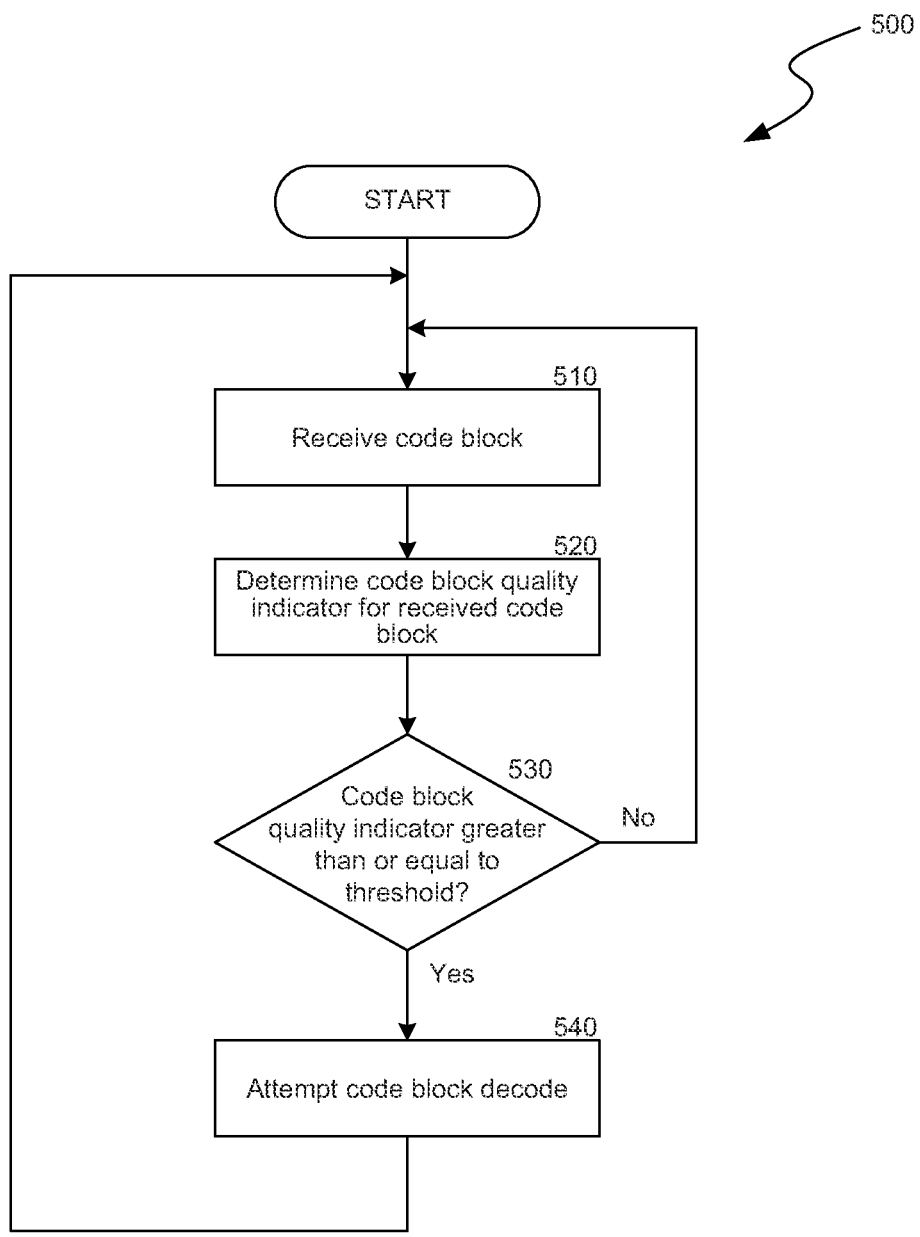
FIG. 5 is a logical flow diagram of a process for selectively decoding code blocks in accordance with an embodiment of the present disclosure.

FIG. 5 is a logical flow diagram of process 500 for selectively decoding code blocks. For clarity, process 500 is described as being performed by particular elements shown in FIGS. 1 to 4. However, process 500 may also be, for example, performed by other components, by other elements, or in other systems, whether or not such components, elements, or systems are described herein.

Flowing from a start block, processing begins at operation 510 where a code block is received, for example, by front end unit 110. Operation 510 may also include receiving a bit stream, demodulating the received bit stream, and generating the received code block from the demodulated bit stream.

From operation 510, processing flows to operation 520 where a code block quality indicator for the received code block is determined, for example, by quality determination unit 352 of FIG. 3. Determining the code block quality indicator may include or be based on any of the features discussed in conjunction with the preceding figures.

Processing then flows to operation 530 where it is determined whether the code block quality indicator is greater than or equal to the threshold, for example, by comparison unit 358 of FIG. 3. In other embodiments, operation 530 may instead include determining whether the code block quality indicator is greater than the threshold, whether the code block quality indicator is less than the threshold, or whether the code block quality indicator is less than or equal to the threshold. The determination of operation 530 may correspond to a determination of a likelihood of successfully decoding a received code block if decoding were attempted. For the illustrated embodiment, if the code block quality indicator is not greater than or equal to the threshold, processing returns to operation 510. Otherwise, processing flows to operation 540.

At operation 540, an attempt to decode the received code block is performed, for example, by decoder 260 of FIG. 2. From operation 540 processing returns to operation 510. While not shown in FIG. 5, if decoding of the received code block is successful, the decoded code block may be provided, for example, to back end unit 130 of FIG. 1 before processing returns to operation 510.

While the above Detailed Description describes certain embodiments of the invention, and describes the best mode contemplated, no matter how detailed the above appears in text, the invention can be practiced in many ways. Details of the system may vary in implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description explicitly defines such terms. Accordingly, the actual scope of the invention encompasses not only the disclosed embodiments, but also all equivalent ways of practicing or implementing the invention under the claims.

What is claimed is:

1. An apparatus for selectively decoding data, comprising:
   a quality determination unit configured to determine a code block quality indicator for a received code block;
   a decoder configured to decode code blocks; and
   a decoder control unit configured to compare the code block quality indicator to a threshold, wherein a value of the code block quality indicator corresponds to a likelihood of successfully decoding the received code block, and to enable decoding of the received code block by the decoder if the code block quality indicator is greater than the threshold and to discard the received code block without decoding if the code block quality indicator is less than the threshold;
   wherein the threshold is a dynamic threshold based on available decoding capacity of the decoder.

2. The apparatus of claim 1, wherein the quality determination unit includes:
   a bit quality determination unit configured to determine the code block quality indicator based on log-likelihood ratios (LLRs) of bits of the received code block.

3. The apparatus of claim 2, wherein the quality determination unit is further configured to determine the code block quality indicator based on an error vector magnitude (EVM) of the received code block or soft-decision demodulation information of the received code block.

4. The apparatus of claim 1, further comprising a front end unit, wherein the front end unit includes:
   a demodulator configured to determine log-likelihood ratios (LLRs) for individual bits of the received code block based on a soft-decision demodulation of a corresponding received bit, and
   wherein the quality determination unit includes:
      a block quality determination unit configured to determine the code block quality indicator based on an average of LLRs for each received bit of the received code block.

5. The apparatus of claim 1, wherein the quality determination unit is further configured to determine the code block quality indicator based on at least one of a Hamming distance between the received code block and a potential matching code block of a code book, a length of the received code block, and a coding rate of the received code block.

6. The apparatus of claim 1, wherein the dynamic threshold is further based on a length of the received code block and a coding strength of the received code block.

7. The apparatus of claim 1, wherein the decoder is at least one of a linear block decoder, a cyclic decoder, a Golay decoder, or a Reed-Solomon decoder.

8. The apparatus of claim 1, further comprising:
   a front end unit configured to receive a bit stream, to demodulate the received bit stream, and to generate the received code block from the demodulated bit stream.

9. A method for selectively decoding data, comprising:
   receiving, by a computing device, a code block;
   determining, by the computing device, a code block quality indicator that represents a likelihood of successfully decoding the received code block;
   comparing the code block quality indicator against a dynamic threshold that is based on a real-time operational characteristic of the computing device; and
   decoding the received code block if the code block quality indicator is greater than the threshold, and discarding the received code block without decoding if the code block quality indicator is less than the threshold.

10. The method of claim 9, wherein the code block quality indicator is based on log-likelihood ratios (LLRs) of bits of the received code block.

11. The method of claim 10, wherein the code block quality indicator is further based on an average of LLRs for individual bit of the received code block, and wherein the LLRs are based on a soft-decision demodulation of corresponding bits.

12. The method of claim 10, wherein the code block quality indicator is based on an error vector magnitude (EVM) of the received code block or soft-decision demodulation information of the received code block.

13. The method of claim 9, wherein the code block quality indicator is based on at least one of a Hamming distance between the received code block and a potential matching code block of a code book, a length of the received code block, or a coding rate of the received code block.

14. The method of claim 9, wherein the real-time operational characteristic of the computing device is an available decoding capacity of a decoder of the computing device, and wherein the dynamic threshold is further based on a length of the received code block and a coding strength of the received code block.

15. A computing device having a digital communications interface, the computing device comprising:

a receiver configured to receive a code block, to demodulate the received code block, and to decode the received code block if a code block quality indicator, corresponding to a likelihood of successfully decoding the received code block, is above a threshold and to discard the received code block if the code block quality indicator is below the threshold, wherein the threshold is a dynamic threshold based on available decoding capacity of the decoder; and a back end unit configured to enable user interaction with data from one or more decoded code blocks.

16. The computing device of claim 15, wherein the receiver comprises:

a front end unit configured to receive the code block from the digital communications interface, the front end unit including:

a demodulator configured to determine log-likelihood ratios (LLRs) associated with individual bits of the received code block based on a soft-decision bit demodulation;

a quality determination unit including:

a bit quality determination unit configured to determine bit quality indicators for individual bits of the received code block based on the LLRs;

a block quality determination unit configured to determine the code block quality indicator based on an average of the bit quality indicators; and a comparison unit configured to compare the code block quality indicator to the threshold and to selectively enable decoding of the received code block based on the comparison; and the decoder configured to, based on an output of the comparison unit, selectively decode the received code block.

* * * * *